United States Patent [19]
Renlger et al.

[11] Patent Number: 6,062,713
[45] Date of Patent: May 16, 2000

[54] NAVIGATION LIGHT

[75] Inventors: Bruce L. Renlger, Alto; Elzie McKinney, Grand Rapids, both of Mich.

[73] Assignee: Attwood Corporation, Lowell, Mich.

[21] Appl. No.: 09/087,814

[22] Filed: May 29, 1998

[51] Int. Cl.$^7$ ................................................. B60Q 3/00
[52] U.S. Cl. ................................. 362/477; 362/226
[58] Field of Search .................... 362/477, 431, 362/226, 413; 439/141; 340/984, 985; 114/343

[56] References Cited

U.S. PATENT DOCUMENTS

| | | | |
|---|---|---|---|
| 994,499 | 6/1911 | Bowen . | |
| 2,297,916 | 10/1942 | Sauer | 173/361 |
| 2,938,109 | 5/1960 | Coleman | 240/7.5 |
| 3,202,812 | 8/1965 | Berry | 240/1.2 |
| 3,253,136 | 5/1966 | Faul | 240/7.5 |
| 3,833,800 | 9/1974 | Stewart et al. | 240/7.5 |
| 3,900,725 | 8/1975 | Komon | 240/7.5 |
| 4,360,862 | 11/1982 | Strasser et al. | 362/240 |
| 4,802,861 | 2/1989 | Gaston | 439/247 |
| 5,142,457 | 8/1992 | Wehner | 362/70 |
| 5,339,225 | 8/1994 | Wiggerman | 362/61 |
| 5,381,141 | 1/1995 | Stahl | 340/984 |
| 5,486,987 | 1/1996 | Fritz, Jr. | 362/226 |
| 5,537,299 | 7/1996 | Perry | 362/61 |
| 5,544,022 | 8/1996 | Blackard | 362/61 |
| 5,980,072 | 11/1999 | Zirkle | 362/477 |

*Primary Examiner*—Nimeshkumar D. Patel
*Assistant Examiner*—Todd Reed Hopper
*Attorney, Agent, or Firm*—Price, Heneveld, Cooper, DeWitt & Litton

[57] ABSTRACT

A marine navigation light assembly for installation in alternately configured mast mounting bases has a mast, a navigation light mounted to a top end of the mast, and an electrical receptacle mounted in a bottom end of the mast and electrically connected to the navigation light. The electrical receptacle includes a receptacle shell and at least two electrical contacts housed in the shell wherein a first of the at least two contacts is fixed with respect to the shell and a second of the at least two contacts laterally floats within the shell and with respect to the first contact for interchangeable mating between electrical plugs having differently spaced electrical pins.

28 Claims, 1 Drawing Sheet

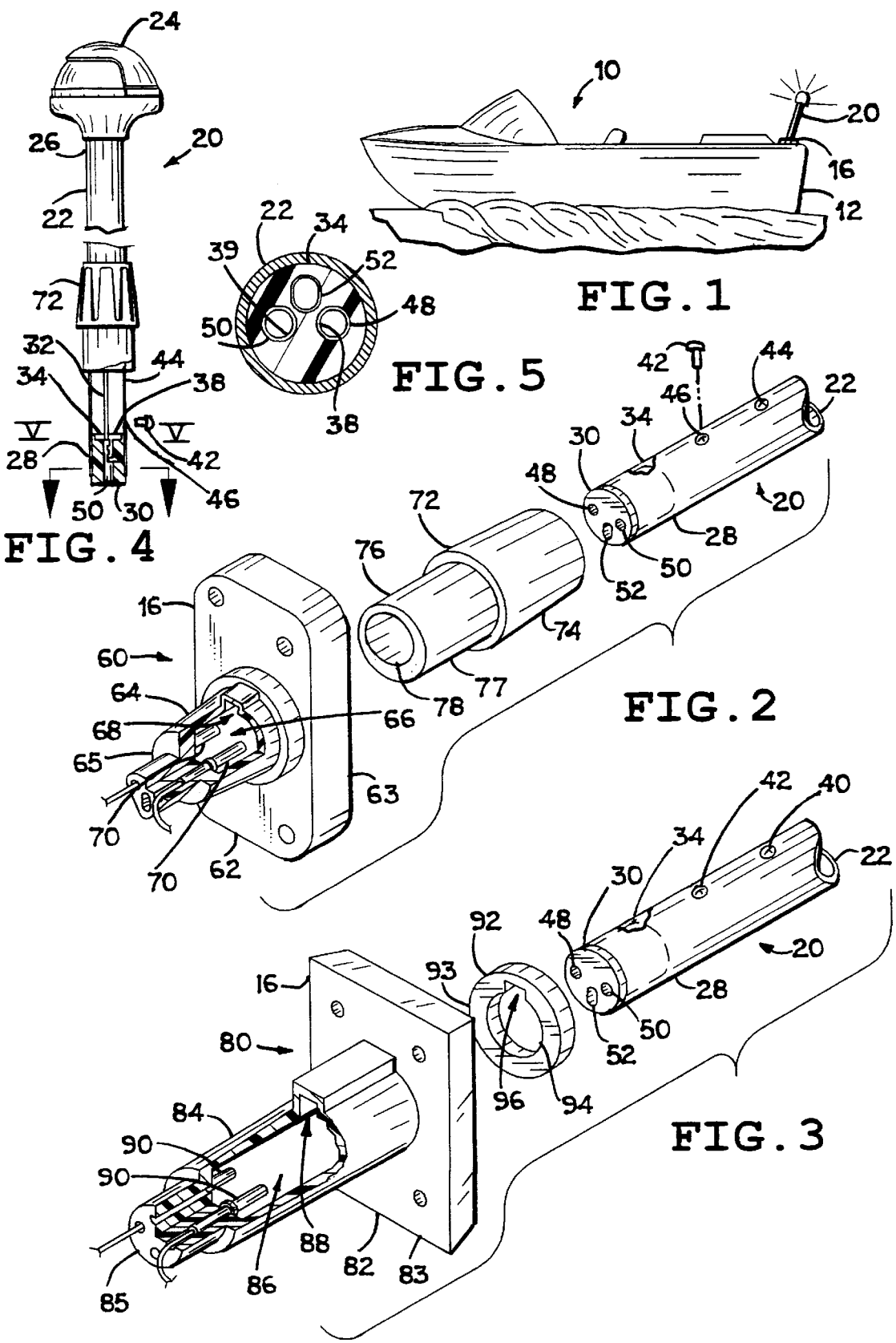

NAVIGATION LIGHT

FIELD OF THE INVENTION

This invention relates to marine craft navigation lights, and more particularly to a universal mast for a marine navigation light which can be removed and reinserted in a mounting base affixed to the hull of a boat.

BACKGROUND OF THE INVENTION

In compliance with U.S. Coast Guard regulations, boaters are required to display navigation lights from sunset to sunrise and during other times of reduced visibility. The display of navigation lights is required so that operators of marine craft can easily determine the position and direction of movement of other boats in proximity to theirs. Typical navigation lights include red and green bow lights and a white light either at the stern of the marine craft or at another position aft of the bow lights and at a certain elevation. Typically, the white navigation light is mounted at the end of a mast which projects above the boat hull. The light mast when not in use is usually stowed inside the boat while the boat is operating during daylight hours or when the boat is tied to a birth. At such time as operation of the boat falls within the times mandated by the U.S. Coast Guard regulations, the boat operator removes the light mast from its storage location and inserts the mast in a mounting base affixed to the hull of the boat.

In general, these navigation light masts are configured with a light at one end of the mast and at an opposite end of the mast is an electrical connector with contacts for mating with pins positioned in the bottom of the mast mounting base. There is more than one manufacturer of light masts and hull mounted mast mounting bases, and while each manufacturer's mast and support is conceptually similar, there is no standard by which the mast and bases are designed. Therefore, a boat owner and operator, in the event of loss or destruction of a light mast, must procure a new mast which is specifically designed to mate with the particular mast mounting base on the hull of the boat. Additionally, each base and mast combination incorporates a mode of keying to ensure the mast is properly aligned with the electrical pins in the base for mating therewith and also includes a retention mechanism to secure the mast within the support to prevent the inadvertent removal thereof.

Because the navigation light and mast assembly is not a permanent fixture of the boat hull and is repeatedly installed and removed from its receptacle, the mast and light are subject to high instances of loss and damage requiring the replacement thereof. Since there is no current standard for navigation light mast supports, in order to replace a lost or damaged light mast a boat owner must either find a replacement mast from the same manufacturer as the one damaged or lost or he must replace the mounting base in addition to the mast. Until now there has been no single mast that would universally fit all of or at least the majority of the support mounts permanently attached to boat hulls. A possible solution to this problem is to manufacture a variety of replacement masts wherein each of the masts is designed and manufactured to fit a particular support mount. However, this is not an economically practical solution, as it would significantly increase manufacturing, packaging, and inventory costs. Accordingly, there is a need for a navigation light and mast assembly which can be universally installed in a variety of navigation light mast mounting bases to permit boat owners and operators the ability to conveniently replace a lost or damaged navigation light mast without having to determine a specific configuration with which to match or to search for a replacement mast manufactured by a specific supplier.

SUMMARY OF THE INVENTION

One aspect of the present invention is a marine navigation light assembly for installation in alternately configured mast mounting bases, which includes a mast, a navigation light mounted to a top end of the mast, and an electrical receptacle mounted in a bottom end of the mast which is electrically connected to the navigation light. The receptacle includes a receptacle shell and at least two electrical contacts housed in the shell wherein a first of the at least two contacts is fixed with respect to the shell and a second of the at least two contacts laterally floats within the shell with respect to the first contact for interchangeable mating between electrical plugs having differently spaced electrical pins.

Another aspect of the present invention is a mast assembly for marine navigation lights for installation in alternately configured mast mounting bases, wherein the assembly comprises a generally elongate mast and an electrical receptacle mounted in a bottom of the mast. The receptacle includes a receptacle shell having a plurality of electrical contacts wherein at least one of the electrical contacts in the shell floats therein for interchangeable mating with alternately configured mast mounting bases having electrical plugs with differently spaced electrical pins.

Yet another aspect of the present invention is a marine navigation light assembly for installation in alternately configured mast mounting bases, wherein the navigation light assembly comprises a mast, a navigation light mounted to a top end of the mast, and an electrical receptacle mounted in a bottom end of the mast. The electrical receptacle is electrically connected to the navigation light. The receptacle includes a receptacle shell and at least two electrical contacts housed in the shell wherein a first of the at least two contacts is fixed with respect to the shell and a second of the at least two contacts laterally floats within the shell with respect to the first contact for interchangeable mating between electrical plugs having differently spaced electrical pins. The mast assembly also includes two screws in a lower portion of the mast wherein heads of the screws are vertically aligned and extend from an outer surface of the mast to guide the mast for installation in a mast mounting base on a boat and to align the electrical receptacle for mating with electrical pins in the mast mounting base.

These and other features, advantages and objects of the present invention will be further understood and appreciated by those skilled in the art by reference to the following specification, claims and appended drawings.

BRIEF DESCRIPTION OF THE DRAWINGS

FIG. 1 is a side elevational view of a boat in the water having a navigation light and mast embodying the present invention installed in the stern of the boat;

FIG. 2 is an exploded, perspective view of a bottom portion of a navigation light mast embodying the present invention for mounting in a first configuration of an existing mast mounting base and rotated approximately 90 degrees;

FIG. 3 is an exploded, perspective view of a bottom portion of a navigation light mast embodying the present invention for mounting in a second configuration of an existing mast mounting base and rotated approximately 90 degrees;

FIG. 4 is a fragmentary, cross-sectional elevational view of a navigation light mast assembly according to the preferred embodiment; and FIG. 5 is an enlarged, cross-sectional view of the bottom portion of the mast and connector shell shown in FIG. 4 taken along the line V—V, FIG. 4.

DETAILED DESCRIPTION OF PREFERRED EMBODIMENT

For purposes of description herein, the terms "upper," "lower," "right," "left," "rear," "front," "vertical," "horizontal," and derivatives thereof shall relate to the invention as oriented in FIG. 4. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 shows a boat 10 having a marine navigation light assembly 20, which is one of the preferred embodiments of the present invention, installed in a mast mounting base 16 at the stern 12 of boat 10.

Marine navigation light assembly 20, most easily seen in FIGS. 4 and 5 includes a mast 22 having a navigation light 24 mounted to a top end 26 of the mast and an electrical receptacle 30 mounted in a bottom end 28 of mast 22. Mast 22 is typically formed as a tubular section. Electrical connector 30 is electrically connected to navigation light 24 with wires 32 extending from electrical contacts 38 to navigation light 24.

Electrical connector 30 is received within the tubular area of the bottom 28 of mast 22 and comprises a connector shell 34 which is generally of a suitable dielectrical material such as a moldable resin or rubber. Electrical receptacle 30 has at least two apertures 48 and 50 therein. At least one of apertures 48 and 50 is slightly elongated and in the preferred embodiment apertures 48 and 50 are both elongated in a like manner. First elongate aperture 50 is elongated in a manner such that its axis of elongation is aligned with the axis of elongation of second elongate aperture 48. Each of apertures 48 and 50 receive therein substantially identical electrical contacts 38 and 39 which in the preferred embodiment are female contacts. Electrical contacts 38 and 39 are received in elongated apertures 48 and 50 in such a manner as to laterally float within each apertures 48 and 50 along the respective axis of elongation. In this manner, the lateral spacing between apertures 38 and 39 is variable as a result of contacts 38 and 39 floating within elongated apertures 48 and 50. The limits to which contacts 38 and 39 are permitted to float is dependent upon the variation and lateral spacing of the electrical pins to which contacts 38 and 39 mate and the elongated length of apertures 48 and 50. A third, or spare, aperture 52 for receiving a third contact can also be provided in connector shell 34. The axis of elongation of spare aperture 52 is perpendicular to the axis of elongation of apertures 48 and 50. Spare aperture 52 is positioned equidistant between the centers of apertures 48 and 50 and offset from the extended axis of elongation of apertures 48 and 50. Apertures 48, 50, and 52 thus generally form a triangular configuration.

In a variation of the preferred embodiment, connector 30 received within the bottom 28 of mast 22 comprises the dielectric connector shell 34 wherein shell 34 has at least two apertures 48 and 50. In this embodiment aperture 48 is a round contact aperture and aperture 50 is a first elongate aperture. First elongate aperture 50 is elongated such that its axis of elongation is aligned with the center of round aperture 48. Again, each of apertures 48 and 50 receive therein substantially identical electrical contacts 38 and 39 which are typically female contacts. Contact 38 is closely received in round aperture 48 such that contact 38 is held relatively immovable with respect to receptacle shell 34. Electrical contact 39 is received in elongated aperture 50 in such a manner as to laterally float within aperture 50 along the axis of elongation. In this manner, the lateral spacing between contacts 38 and 39 is also variable as a result of contact 39 floating within elongated aperture 50. However, the degree of variability between contact spacing is typically less than the preferred embodiment wherein both contacts float.

Bottom portion 28 of mast 22 also has upper and lower alignment apertures 44 and 46 through the wall of mast 22 and are arranged such that apertures 44 and 46 are vertically aligned and are radially opposite from spare aperture 52. Upper and lower apertures 44 and 46 receive therein upper and lower alignment screws 40 and 42, respectively, and are used to align and orient navigation light assembly 20 in mast mounting base 16 as described more fully below.

FIGS. 2 and 3 show navigation light assembly 20 in combination with alternate configurations 60 and 80 of mast mounting base 16.

Referring to FIG. 2, mast mounting base 16 in a first configuration 60 (shown rotated 90 degrees from vertical) and which is generally known in the art has a base 62 including a flange 63 for interfacing with a boat hull and also includes a mast receptacle 64 depending downwardly therefrom. Mast receptacle 64 defines a receptacle cavity 66 therein for receiving bottom portion 28 of mast 22. Mast receptacle 64 has two laterally spaced electrical pins 70 extending upwardly from a bottom 65 of mast receptacle 64. Electrical pins 70 have a fixed lateral spacing determined by the individual manufacturer's design criteria. In this particular configuration, alignment screws 40 and 42 are removed from the lower portion 28 of mast 22 and upper alignment screw 40 is discarded. Cam lock 72 is telescoped over lower portion 28 of mast 22 by inserting lower end 28 of mast 22 through barrel aperture 78. Cam lock 72 is slid above lower alignment aperture 46 and lower alignment screw 42 is then replaced. The protruding head of lower alignment screw 42 prevents cam lock 72 from sliding off the lower end 28 of mast 22.

To insert and install navigation light assembly 20 in first mounting base 60, mast 22 is axially rotated until the head of lower alignment screw 42 is aligned with key slot 68 in mast receptacle 64. Mast 22 is then axially telescoped into mast receptacle 64 until contacts 38 and 39 come in contact with pins 70. Since contact 39 in elongated aperture 50 floats therein, the lateral spacing of contacts 38 and 39 is automatically adjusted to correspond to the spacing of pins 70 as contacts 38 and 39 engage pins 70. Mast 22 is axially translated downwardly until such time as contacts 38 and 39 are firmly seated and engaged with pins 70. Cam lock 72 is then axially translated downwardly until barrel 76 is received within mast receptacle 64. Barrel aperture 78 in cam lock 72 is laterally offset from the longitudinal axis of cam lock 72. Once mast 22 and cam lock 72 are engaged within receptacle cavity 66 of mast receptacle 64, the user grasps grip 74 of cam lock 72 and twists in either a clockwise or counterclockwise direction which in turn interferingly engages outer wall 74 of barrel 76 within mast receptacle 64. To disengage mast 22, cam lock 72 is twisted in an opposite direction and navigation light assembly 20 is axially removed from mounting base 60 and stowed in an appropriate place in the boat.

Referring now to FIG. 3, navigation light assembly 20 can also be utilized in a second configuration 80 of mast mounting base 16 (also shown rotated 90 degrees from vertical). Second mast mounting base 80 is also of a configuration known in the art and has a base 82 which includes a mounting flange 83 for interfacing with the boat hull and has depending therefrom mast receptacle 84. Mast receptacle 84 defines a receptacle cavity 86 which receives mast 22. A bottom 85 of mast receptacle 84 has electrical connector pins 90 extending vertically upward into receptacle cavity 86 and are laterally spaced one from the other according to the manufacturer's design criteria. The lateral spacing of electrical pins 90 is typically different than the lateral spacing of electrical pins 70 in the previous configuration 60 of mast mounting base 16. Second configuration 80 includes a lock ring 92 which rests in a recessed shoulder (not shown) of an upper portion of mounting flange 83 and is rotatable therein about the longitudinal axis of receptacle cavity 86. Lock ring 92 has a central aperture 94 therethrough and a key slot 96 at a periphery of aperture 94 which, when lock ring 92 is corresponding rotated, aligns with key slot 88 in mast receptacle 84.

To install navigation light assembly 20 in configuration 80 of mast mounting base 16, key slot 96 of lock ring 92 is aligned with key slot 88 in mast receptacle 84 and mast 22 is axially telescoped through lock ring 92 and into mast receptacle 84 wherein the protruding heads of alignment screws 40 and 42 are aligned with key slot 96 and key slot 88 until contacts 38 and 39 become engaged with electrical pins 90. Upon engagement of contacts 38 and 39 with electrical pins 90, receptacle contact 39 laterally self-adjusts within elongated aperture 50 of connector shell 34 to correspond to the lateral spacing of electrical pins 90 in mast receptacle 84. Mast 22 is further axially translated within mast receptacle 84 until contacts 38 and 39 are firmly seated and engaged with electrical pins 90. Once firmly seated within mast receptacle 84, upper alignment screw 40 is positioned immediately below a lower surface 93 of lock ring 92 such that when lock ring 92 is rotated within mounting flange 83 the protruding head of alignment screw 40 bears upon bottom surface 93 of lock ring 92 thereby preventing the unintentional withdrawal of navigation light 20 from second configuration 80 of mast mounting base 16. To remove navigation light assembly 20, lock ring 92 is rotated until key slot 96 is aligned with key slot 88 of mast receptacle 84 and upper and lower alignment screws 40 and 42 of mast 22. Navigation light assembly 20 can then be axially removed from second configuration 80 of mast mounting base 16.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. A marine navigation light assembly for installation in alternately configured mast mounting bases, said navigation light assembly comprising:
    a mast;
    a navigation light mounted to a top end of said mast; and
    an electrical receptacle mounted in a bottom end of said mast and electrically connected to said navigation light, said receptacle including a receptacle shell and at least two electrical contacts housed in said shell wherein a first of said at least two contacts is fixed with respect to said shell and a second of said at least two contacts laterally floats within said shell with respect to said first contact for interchangeable mating between electrical plugs having differently spaced electrical pins.

2. The marine navigation light assembly according to claim 1, wherein said shell defines at least two apertures therein for receiving said contacts.

3. The marine navigation light assembly according to claim 2, wherein said axes of said apertures are generally parallel with a longitudinal axis of said mast.

4. The marine navigation light assembly according to claim 3, wherein a first circular aperture of said at least two recesses receives said first fixed contact, and a second elongated aperture of said at least two recesses receives said second floating contact, said second floating contact laterally movable within said elongation.

5. The marine navigation light assembly according to claim 4, wherein a center of said first circular aperture lies on an extended long axis of a cross section of said elongated aperture.

6. The marine navigation light assembly according to claim 5, wherein a lower portion of said mast includes two vertically aligned screws to guide said mast for installation in a mast mounting base on a boat and to align said electrical receptacle for mating with electrical pins in the mast mounting base.

7. The marine navigation light assembly according to claim 6, wherein an upper screw of said two screws is removable to reconfigure said mast for installation in each of the alternately configured mast mounting bases.

8. The marine navigation light assembly according to claim 5, wherein said first aperture is an elongated aperture having an extended axis of elongation coincident with said extended axis of elongation of said second aperture and further wherein said first contact is laterally movable within said first aperture.

9. The marine navigation light assembly according to claim 8, wherein a lower portion of said mast includes two vertically aligned screws to guide said mast for installation in a mast mounting base on a boat and to align said electrical receptacle for mating with electrical pins in the mast mounting base.

10. The marine navigation light assembly according to claim 9, wherein an upper screw of said two screws is removable to reconfigure said mast for installation in each of the alternately configured mast mounting bases.

11. A mast assembly for marine navigation lights for installation in alternately configured mast mounting bases, said mast assembly comprising:
    a generally elongate mast; and
    an electrical receptacle mounted in a bottom end of said mast, said receptacle including a receptacle shell having a plurality of electrical contacts wherein at least one of said electrical contacts in said shell floats therein for interchangeable mating with alternately configured mast mounting bases having electrical plugs with differently spaced electrical pins.

12. A mast assembly according to claim 11, wherein said shell defines at least one aperture therein for each of said contacts, each said contact received in one of said apertures.

13. A mast assembly according to claim 12, wherein a longitudinal axis of each said aperture is generally parallel with a longitudinal axis of said mast.

14. A mast assembly according to claim 13, wherein a first aperture of said recesses is circular and fixedly receives a first contact, and further wherein a second aperture of said recesses is elongated and receives said floating contact, said floating contact being laterally movable within said elongated aperture.

15. A mast assembly according to claim 14, wherein a center of said first aperture lies on an extended long axis of a cross section of said elongated aperture.

16. A mast assembly according to claim 15, wherein a lower portion of said mast includes two vertically aligned screws to guide said mast for installation in a mast mounting base on a boat and to align said electrical receptacle for mating with electrical pins in the mast mounting base.

17. A mast assembly according to claim 16, wherein at least an upper screw of said two screws is selectively removable to reconfigure said mast for installation in each of the alternately configured mast mounting bases.

18. A mast assembly according to claim 13, wherein at least two of said apertures are elongated wherein each has an axis of elongation such that when extended, said axes are coincident one with the other, and further wherein said contacts received in said elongated apertures laterally float therein along said axes of elongation.

19. A mast assembly according to claim 18, wherein a lower portion of said mast includes two vertically aligned screws to guide said mast for installation in a mast mounting base on a boat and to align said electrical receptacle for mating with electrical pins in the mast mounting base.

20. A mast assembly according to claim 19, wherein at least an upper screw of said two screws is selectively removable to reconfigure said mast for installation in each of the alternately configured mast mounting bases.

21. A marine navigation light assembly for installation in alternately configured mast mounting bases, said navigation light assembly comprising:

a mast;

a navigation light mounted to a top end of said mast;

an electrical receptacle mounted in a bottom end of said mast and electrically connected to said navigation light, said receptacle including a receptacle shell and at least two electrical contacts housed in said shell wherein a first of said at least two contacts is fixed with respect to said shell and a second of said at least two contacts laterally floats within said shell with respect to said first contact for interchangeable mating between electrical plugs having differently spaced electrical pins; and two screws in a lower portion of said mast, heads of said screws vertically aligned and extending from an outer surface of said mast to guide said mast for installation in a mast mounting base on a boat and to align said electrical receptacle for mating with electrical pins in the mast mounting base.

22. A marine navigation light assembly according to claim 21, wherein at least an upper screw of said two screws is selectively removable to reconfigure said mast for installation in each of the alternately configured mast mounting bases.

23. A marine navigation light assembly according to claim 22, wherein said shell defines at least two apertures therein for receiving said contacts.

24. A marine navigation light assembly according to claim 23, wherein said axes of said apertures are generally parallel with a longitudinal axis of said mast.

25. A marine navigation light assembly according to claim 24, wherein a first circular aperture of said at least two apertures receives said first fixed contact, and a second elongated aperture of said at least two apertures receives said second floating contact, said second floating contact laterally movable within said elongated aperture.

26. A marine navigation light assembly according to claim 15, wherein a center of said first circular aperture lies on an extended long axis of a cross section of said elongated aperture.

27. A marine navigation light assembly according to claim 24, wherein said at least two apertures are elongated having coincident extended axes of elongation and further wherein said contacts received by said elongated apertures float along said axes.

28. A marine navigation light assembly according to claim 27 further including:

a third elongated aperture offset from said axes of elongation of said at least two elongated apertures and equi-distant between said elongated apertures and further wherein said third aperture has an axis of elongation substantially at right angles to said axes of elongation of said at least two elongated apertures.

* * * * *